May 2, 1961  J. F. MENKE  2,982,861
COMBINATION OF AN OPTICAL AND ELECTRONIC-OPTICAL SYSTEM
OF A RESOLVING POWER TUNED TO EACH OTHER
WITH SUBMINIATURE-HIGH VOLTAGE SUPPLY
Filed March 20, 1959
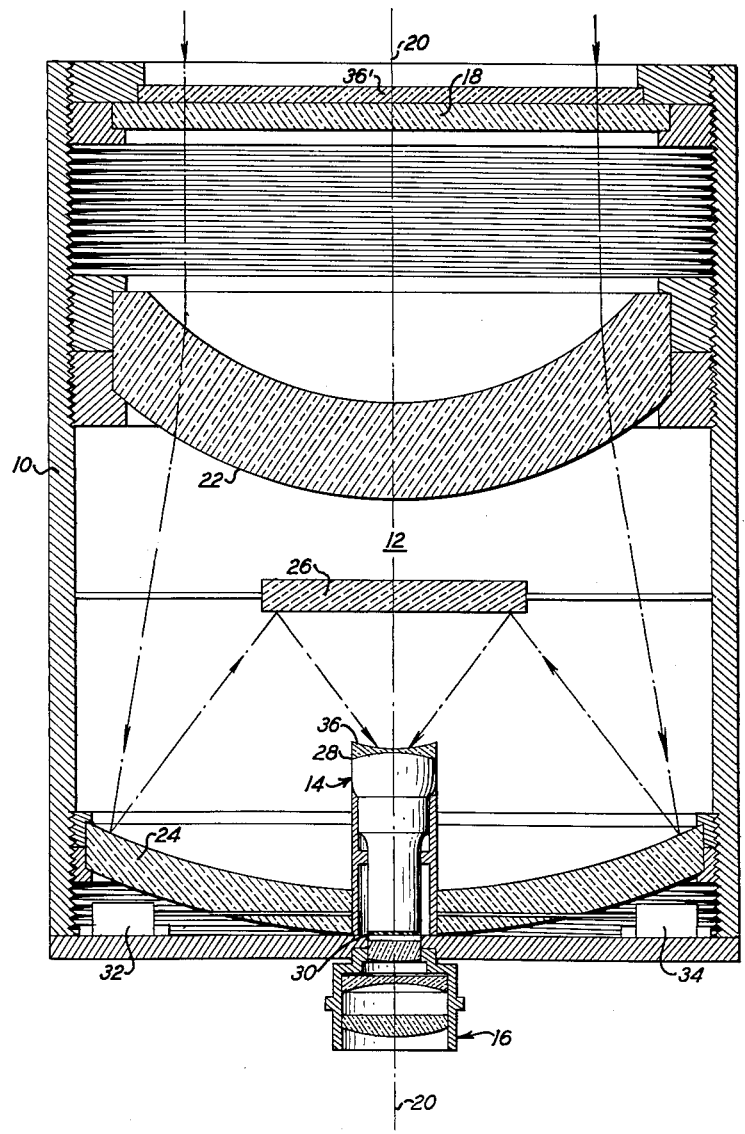

United States Patent Office 2,982,861
Patented May 2, 1961

2,982,861

COMBINATION OF AN OPTICAL AND ELECTRONIC-OPTICAL SYSTEM OF A RESOLVING POWER TUNED TO EACH OTHER WITH SUBMINIATURE-HIGH VOLTAGE SUPPLY

Joseph F. Menke, Heidelberg, Germany, assignor to Eltro Gesellschaft für Strahlungtechnik m.b.H., Heidelberg, Germany Filed Mar. 20, 1959, Ser. No. 800,885

Claims priority, application Germany Mar. 22, 1958

4 Claims. (Cl. 250—213)

This invention pertains to image forming systems and more particularly to image forming systems which include combined light optical systems and electron optical systems.

In the past, image forming systems, which were combinations of conventional light optical systems and electron optical systems, have been proposed and used to a limited extent. For example, during the Second World War a system known as UHU was employed to obtain infra-red pictures. However, such systems, because they used conventional light optical elements, had extremely long focal lengths and were consequently very large and unwieldy. Furthermore, the electron optical portions of these systems required high voltages for their image converting tube systems. Consequently, high voltage supplies of great weight were needed. In fact, these systems weighed nearly a ton and were therefore difficult to move from position to position.

It is accordingly an object of the invention to provide an image forming system which is relatively compact and light in weight.

It is another object of the invention to provide an improved image forming system which, because of its compactness and light weight, is very portable.

It is a further object of the invention to provide an image forming system employing an electron optical means having a self-contained power supply.

It is a still further object of the invention to provide an improved light optical system of relatively short structural length by shortening the inherently long focal length in a double mirror system for use in conjunction with a compatible electron optical system.

Other objects, features and advantages of the invention will be apparent from the following detailed description when read with the accompanying figure which shows an image forming system in accordance with a preferred embodiment of the invention.

The sole figure shows a preferred embodiment of the image forming system comprising a housing 10 which contains a light optical system 12, an electron optical system or image converter tube 14 and a second light optical system or magnifying lens 16. Visible or invisible light from a remote object enters the window 18 of the housing 10 and is formed into an image by the light optical system 12. This image serves as an object for the image converter tube 14 which forms an image that serves as an object for the magnifying lens 16.

More particularly, the first light optical system 12 is a conventional mirror system consisting of a main spherical mirror, a secondary or reflex mirror and a lens for correcting the aberration of the spherical main mirror, all disposed along the optical axis 20 of the image forming system. Light from the window 18 is focused by the correcting lens 22 onto the spherical mirror 24. Spherical mirror 24 reflects this light towards secondary mirror 26, which in turn reflects the light towards the image converter tube 14. Thus, first light optical system 12 forms at the image converter tube 14 the image of an object viewed through the window 18.

The image converter tube 14, which may be of conventional design, includes a photocathode 28 and an fluorescent screen 30 and a well-known electrostatic electron lens system interposed between the photocathode 28 and the fluorescent screen 30. The electron lens system may be, by way of example, axially displaced cylindrical electrodes maintained at different potentials to focus beams of electrons that travel from the photocathode 28 to the fluorescent screen 30. The photocathode 28 has the property that when it receives light from the mirror 26, it emits electrons. These emitted electrons are focused and accelerated toward the fluorescent screen 30 by the electrostatic electron lenses. The fluorescent screen 30 has the property of glowing whenever it is struck by electrons. In this way, an image of the pattern of light impinging on the photocathode 28 is formed on the fluorescent screen 30. This image is further magnified by magnifying lens 16.

An important feature of the invention is the matching of the respective resolutions of the optical and electron-optical systems. The electron-optical system generally has a resolution of 30 lines to the mm.: i.e., about 30 microns. This resolution is limited by the grain size of the material constituting the fluorescent screen.

If the first optical system has a resolution of about 35 microns, the two systems are adequately matched, and this can be obtained with an optical aperture ratio of 1:0.7 and a focal length of 35 cm., for example.

Magnifying lens 16 is of conventional design and has a magnification of 2.5 times so that the entire magnification is equal to 1:3.5.

The high voltages required by the electron lens system in the image converter tube 14, are supplied by transistorized power supplies 32 and 34 disposed within the housing 10. Each of the electrodes of the electrostatic electron lens receives its voltage via an independent connection to one of the power supplies. Thus, they are completely independent of each other and are separately adjustable. It is to be noted, moreover, that the power supplies are provided on and within the housing and thus are very conveniently disposed. It should be noted that when the photocathode 28 of the image converter tube 14 is a curved surface, it will be necessary to provide an additional lens 36 to compensate for the curvature.

Generally, the image forming system is designed to be used with visible light or infra-red systems. Accordingly, either the object being viewed may be illuminated by a source of visible light or infra-red radiation, or the heat from the object supplies its own source of infra-red radiation. When employed in infra-red systems, it may be necessary to include an infra-red filter 36' across the window 18 to permit only the transmission of infra-red radiation to the light optical system 12. Furthermore, the lenses within the first optical system should be fabricated from a material which is transparent to infra-red radiation, and the mirrors should yield maximum reflection thereof.

There has thus been shown an image forming system which is relatively light and compact and therefore lends itself to portability. In particular, in a working embodiment, the whole image forming system has a total length of 85 centimeters and a diameter of 65 centimeters and weighs approximately 80 kilograms.

There will now be obvious to those skilled in the art, many modifications and variations satisfying the objects and gaining many of the advantages of the invention and which do not depart from the spirit of the invention as defined in the claims which follow.

What is claimed is:

1. An image forming system comprising a first light lens, a spherical main mirror for receiving light from said first light lens, a secondary mirror receiving light from said spherical mirror, and an image converter tube having a photocathode and an electroluminescent screen, the photocathode of said image converter tube being disposed to receive light from said secondary mirror to project an image on the electroluminescent screen, said mirrors and lens and said image converter tube respectively constituting an optical system and an electron-optical system, said systems having matched resolutions.

2. An image forming system comprising a first light lens, a spherical main mirror for receiving light from said first light lens, a secondary mirror for receiving light from said spherical mirror, an image converter tube having a photocathode and an electroluminescent screen, the photocathode of said image converter tube being disposed to receive light from said secondary mirror to project an image on the electroluminescent screen, and a magnifying device for magnifying the image on the electroluminescent screen, said mirrors and lens and said image converter tube respectively constituting an optical system and an electron-optical system, said systems having matched resolutions in the order of about 30–35 microns.

3. An image forming system comprising a first light lens, a spherical mirror for receiving light from said first light lens, a secondary mirror for receiving light from said spherical mirror, an image converter tube having a photocathode, an electron lens system and an electroluminescent screen, means for disposing the photocathode for receiving light from said secondary mirror to project an enlarged image on the photoluminescent screen, the limit of resolution of said first lens and spherical mirror system being substantially equal to the resolving power of said electron lens system, and a magnifying device for magnifying the image on the electroluminescent screen, said mirrors and lens and said image converter tube respectively constituting an optical system and an electron-optical system, said systems having matched resolutions, the optical system having an optical aperture ratio of about 1:0.7 and a focal length of about 35 cm.

4. An image forming system having an optical axis comprising a first light lens centered on said axis, a spherical mirror centered about said axis for receiving light from said first light lens, a secondary mirror centered about said axis for receiving light from said spherical mirror, means for disposing said secondary mirror between said first light lens and said spherical mirror, the cross-section of said secondary mirror being less than the cross-section of said first light lens and said spherical mirror to permit the transmission of light from said first light lens to said spherical mirror, an image converter tube having a photocathode, an electron lens system and an electroluminescent screen, a housing supporting said lens, tube and mirrors, said image converter tube being disposed on said optical axis and extending through said spherical mirror with the photocathode positioned to receive light from said secondary mirror, a transistor power supply on said housing for energizing the electron lens system for causing the projection of an enlarged image on the electroluminescent screen, and a magnifying device for magnifying the image on the electroluminescent screen, said mirrors and lens and said image converter tube respectively constituting an optical system and an electron-optical system, said systems having matched resolutions.

References Cited in the file of this patent

UNITED STATES PATENTS

| | | |
|---|---|---|
| 2,627,530 | Fastie | Feb. 3, 1953 |
| 2,772,479 | Doyle | Dec. 4, 1956 |
| 2,825,815 | Dis Ario | Mar. 4, 1958 |